(12) United States Patent
Ovadia

(10) Patent No.: US 8,582,461 B2
(45) Date of Patent: Nov. 12, 2013

(54) ANALYTICAL COMPUTATION OF CUBIC METRIC

(75) Inventor: Yakir Ovadia, Kfar Saba (IL)

(73) Assignee: Marvell World Trade Ltd, St. Michael (BB)

( * ) Notice: Subject to any disclaimer, the term of this patent is extended or adjusted under 35 U.S.C. 154(b) by 366 days.

(21) Appl. No.: 13/004,052

(22) Filed: Jan. 11, 2011

(65) Prior Publication Data

US 2011/0170441 A1    Jul. 14, 2011

Related U.S. Application Data

(60) Provisional application No. 61/294,016, filed on Jan. 11, 2010, provisional application No. 61/371,464, filed on Aug. 6, 2010.

(51) Int. Cl.
*H04W 24/00* (2009.01)

(52) U.S. Cl.
USPC .......................... 370/252; 370/253

(58) Field of Classification Search
USPC .......................... 370/252; 455/572
See application file for complete search history.

(56) References Cited

U.S. PATENT DOCUMENTS

| | | | | |
|---|---|---|---|---|
| 7,778,347 B2* | 8/2010 | Chen et al. | ...... | 375/295 |
| 7,912,115 B2* | 3/2011 | Zhao et al. | ...... | 375/219 |
| 8,165,642 B2* | 4/2012 | Dimpflmaier et al. | ...... | 455/572 |
| 8,355,424 B2* | 1/2013 | Xi et al. | ...... | 375/144 |
| 2006/0068830 A1* | 3/2006 | Klomsdorf et al. | ...... | 455/522 |
| 2008/0043877 A1* | 2/2008 | Chen et al. | ...... | 375/295 |
| 2009/0268695 A1* | 10/2009 | Zhao et al. | ...... | 370/336 |
| 2010/0039928 A1* | 2/2010 | Noh et al. | ...... | 370/210 |
| 2010/0291975 A1* | 11/2010 | Dimpflmaier et al. | ...... | 455/572 |
| 2010/0308909 A1* | 12/2010 | Verma et al. | ...... | 330/131 |
| 2010/0329203 A1* | 12/2010 | Lee et al. | ...... | 370/329 |
| 2011/0080972 A1* | 4/2011 | Xi et al. | ...... | 375/267 |
| 2011/0182197 A1* | 7/2011 | Jones et al. | ...... | 370/252 |

OTHER PUBLICATIONS

Jack Raymond and David Saad, Composite CDMA—A statistical mechanics analysis, May 22, 2009.*
QUALCOMM Europe, "Transmitter Maximum Power Reduction with HS-DPCCH and E-DCH Channels", TSG-RAN Working Group 4 (Radio) meeting RAN4#37, Seoul, South Korea, Nov. 7-11, 2005.
Motorola, "Higher Order Modulations in HSPA Uplink—Practical Considerations", 3GPP TSG RAN1#47, Riga, Latvia, Nov. 6-10, 2006.
Motorola, "UE E-TFC and MPR", 3GPP RAN4#34, Athens, Greece, May 9-13, 2005.
3GPP TS 25.101, "3rd Generation Partnership Project; Technical Specification Group Radio Access Network; User Equipment (UE) radio transmission and reception (FDD) (Release 9)", Version 9.2.0, Sophia Antipolis, France, Dec. 2009.

* cited by examiner

*Primary Examiner* — Hassan Kizou
*Assistant Examiner* — Emmanuel Maglo

(57) ABSTRACT

A method includes determining attributes of multiple Code-Division Multiple Access (CDMA) signals, which are to be superimposed to form a composite CDMA signal for transmission by a wireless transmitter. A predefined analytical formula, which computes a Cubic Metric of the composite CDMA signal as a function of the attributes, is evaluated. Transmission of the composite CDMA signal by the wireless transmitter is controlled based on the computed Cubic Metric.

12 Claims, 7 Drawing Sheets

| | I,Q | $N_{MAXDPDCH}$ | k | HS conf | Betas |
|---|---|---|---|---|---|
| 1 | I:$\beta_{ec}(256,1),\beta_{ed12}(2,1),\beta_{ed34}(4,1)$<br>Q:$\beta_c(256,0),\beta_{hs}(256,33),\beta_{ed12}(2,1),\beta_{ed34}(4,1)$ | 0 | If $\beta_{ed12}(2,1)=0$, 1.85<br>Else 1.56 | Yes/No | 5(7) |
| 2 | I:$\beta_{ec}(256,1),\beta_d(SF,SF/4),\beta_{ed12}(2,1)$<br>Q:$\beta_c(256,0),\beta_{hs}(256,64),\beta_{ed12}(2,1)$ | 1 | If $\beta_{ed12}(2,1)=0$, 1.85<br>Else 1.56 | Yes/No | 5(6) |
| 3 | I:$\beta_{ec}(256,1),\beta_d(SF,SF/4),\beta_{ed12}(4,2)$<br>Q:$\beta_c(256,0),\beta_{hs}(256,64),\beta_{ed12}(4,2)$ | 1 | If $\beta_{ed12}(4,2)=0$, 1.85<br>Else 1.56 | Yes/No | 5(6) |
| 4 | I:$\beta_{ec}(256,1),\beta_d(SF,SF/4),\beta_{ed1}(SFe,SFe/2)$<br>Q:$\beta_c(256,0),\beta_{hs}(256,64)$ | 1 | If $\beta_{ed12}=0$ , 1.85<br>Else 1.56 | Yes | 5 |
| 5 | I:$\beta_{ec}(256,1),\beta_{ed1}(SFe,SFe/4)$<br>Q:$\beta_c(256,0),\beta_{hs}(256,33)$ | 0 | 1.85 | Yes/No | 4 |
| 6 | I:$\beta_{ec}(256,1),\beta_d(SF,SF/4)$<br>Q:$\beta_c(256,0),\beta_{ed1}(SFe,SFe/2)$ | 1 | If $\beta_{ed12}=0$ , 1.85<br>Else 1.56 | Yes | 4 |

| Case | $\beta_1=\beta_{ec}$ | $\beta_2=\beta_d$ | $\beta_3=\beta_{ed12}$ or $\beta_{ed1}$ | $\beta_4=\beta_c$ | $\beta_5=\beta_{hs}$ | $\beta_6=\beta_{ed34}$* | Repetitions |
|---|---|---|---|---|---|---|---|
| 1 | + | − | $\beta_{ed12}$ | + | + | + | $\vec{a}=(1,0,2,1,1,2)$ |
| 2 | + | + | $\beta_{ed12}$ | + | + | − | $\vec{a}=(1,1,2,1,1,0)$ |
| 3 | + | + | $\beta_{ed12}$ | + | + | − | $\vec{a}=(1,1,2,1,1,0)$ |
| 4 | + | + | $\beta_{ed1}$ | + | + | − | $\vec{a}=(1,1,1,1,1,0)$ |
| 5 | + | − | $\beta_{ed1}$ | + | + | − | $\vec{a}=(1,0,1,1,1,0)$ |
| 6 | + | + | $\beta_{ed1}$ | + | − | − | $\vec{a}=(1,1,1,0,0,0)$ |

FIG. 3C

| Case | $b_{12}$ | $b_{13}$ | $b_{23}$ | $b_{34}$ | $b_{35}$ | $b_{45}$ | $b_{16},b_{46},b_{56}$ | $b_{36}$ | $c_{123}$ | $c_{345}$ | $c_{136},c_{346},c_{356}$ | $c_{456}$ |
|---|---|---|---|---|---|---|---|---|---|---|---|---|
| 1 |  | 8.67 |  | 7.11 | 8.67 | 8.55 | 7.11 | 17.35 |  |  |  |  |
| 2 | $5.73+\frac{5.46}{SF_d}$ | 8.67 | 8.67 | 8.67 | 8.67 | 5.75 |  |  | $22.58+\frac{11.09}{SF_d}$ | 28.3 | 25.0 | 22.4 |
| 3 | $5.73+\frac{5.46}{SF_d}$ | 7.92 | 9.41 | 7.92 | 9.41 | 5.75 |  |  | $22.58+\frac{11.09}{SF_d}$ | 22.7 |  |  |
| 4 | $5.36+\frac{3.24}{SF_d}$ | $8.31-\frac{2.64}{\min(SF_d,SF_{ed})}$ |  | 1.75 | 1.75 | 5.74 |  |  | $19.33+\frac{7.7}{SF_d}+\frac{5.9}{SF_{ed}}-\frac{5.9}{\min(SF_d,SF_{ed})}$ | 22.8 |  |  |
| 5 | $5.73+\frac{5.46}{SF_d}$ |  |  |  |  | 8.55 |  |  |  | 3.40 |  |  |
| 6 | $5.73+\frac{5.46}{SF_d}$ | 1.75 | 1.75 | $5.36+\frac{3.24}{SF_{ed}}$ |  |  |  |  | $3.36+\frac{3.41}{SF_d}$ |  |  |  |

| Case | $N_{maxdpch}$ | $L_e$ | HS Config | I | Q | 1) $\left[\sum_m a_m \cdot \beta_m^2\right]$ 2) $\left[\sum_{i \neq j} b_{ij} \cdot \beta_i^2 \cdot \beta_j^2\right]$ 3) $\left[\sum_{k \neq l \neq n} c_{kln} \cdot \beta_k^2 \cdot \beta_l^2 \cdot \beta_n^2\right]$ | k |
|---|---|---|---|---|---|---|---|
| | | | $\beta_x(SF,k)$ defines code $c_x=c_{ch}, SF, k$ for $\beta_x$ $\beta_{hs}=0$ if HS is not configured | | | | |
| 0(5) | 0 | 0 | Yes/No | None | $\beta_c(256,0)$, $\beta_{hs}(256,33)$ | $\beta_c^2 + \beta_{hs}^2$ | 1.85 |
| | | | | | | $8.55 \cdot \beta_c^2 \cdot \beta_{hs}^2$ | |
| | | | | | | 0 | |
| 1(5) | 0 | 1 | Yes/No | $\beta_{ec}(256,1)$, $\beta_{ed1}(SFed, SFed/4)$ | $\beta_c(256,0)$, $\beta_{hs}(256,33)$ | $(\beta_c^2 + \beta_{ec}^2 + \beta_{hs}^2) + R^2 \cdot (\beta_{ed12}^2)$ | 1.85 |
| | | | | | | $(8.55 \cdot \beta_c^2 \cdot \beta_{hs}) + R^2 \cdot \left(\left[5.73 + \dfrac{5.46}{SF_{ed}}\right] \cdot \beta_{ec}^2 \cdot \beta_{ed12}^2\right)$ | |
| | | | | | | 0 | |
| 2(1) | 0 | 2 | Yes/No | $\beta_{ec}(256,1)$, $\beta_{ed1}(4,1)$ | $\beta_c(256,0)$, $\beta_{hs}(256,33)$, $\beta_{ed2}(4,1)$ | $(\beta_c^2 + \beta_{hs}^2 + \beta_{ec}^2) + R^2 \cdot (2 \cdot \beta_{ed12}^2)$ | 1.85 |
| | | | | | | $(8.55 \cdot \beta_c^2 \cdot \beta_{hs}) + R^2 \cdot (7.11 \cdot [\beta_c^2 \cdot \beta_{ed12}^2 + \beta_{hs}^2 \cdot \beta_{ed12}^2 + \beta_{ec}^2 \cdot \beta_{ed12}^2])$ | |
| | | | | | | $R^2 \cdot (28.3 \cdot \beta_c^2 \cdot \beta_{hs}^2 \cdot \beta_{ed12}^2)$ | |
| 3(1) | 0 | 4 | Yes/No | $\beta_{ec}(256,1)$, $\beta_{ed1}(2,1)$ | $\beta_c(256,0)$, $\beta_{hs}(256,33)$, $\beta_{ed2}(2,1)$ | $(\beta_c^2 + \beta_{hs}^2 + \beta_{ec}^2) + R^2 \cdot (2 \cdot \beta_{ed12}^2)$ | 1.56 |
| | | | | | | $(8.55 \cdot \beta_c^2 \cdot \beta_{hs}) + R^2 \cdot (8.67 \cdot [\beta_c^2 \cdot \beta_{ed12}^2 + \beta_{hs}^2 \cdot \beta_{ed12}^2 + \beta_{ec}^2 \cdot \beta_{ed12}^2])$ | |
| | | | | | | $R^2 \cdot (28.3 \cdot \beta_c^2 \cdot \beta_{hs}^2 \cdot \beta_{ed12}^2)$ | |

| Case | $N_{maxtxpch}$ | $L_e$ | HS Config | I: $\beta_x(SF,k)$ defines code $c_x=c_{ch,SF,k}$ for $\beta_x$; $\beta_{hs}=0$ if HS is not configured | Q | 1) $[\sum_m a_m \cdot \beta_m^2]$ 2) $[\sum_{i \neq j} b_{ij} \cdot \beta_i^2 \cdot \beta_j^2]$ 3) $[\sum_{k \neq l \neq n} c_{kln} \cdot \beta_k^2 \cdot \beta_l^2 \cdot \beta_n^2]$ | k |
|---|---|---|---|---|---|---|---|
| 4(1) | 0 | 6 | Yes/No | $\beta_{ec}(256,1)$, $\beta_{ed1}(2,1)$, $\beta_{ed3}(4,1)$ | $\beta_c(256,0)$, $\beta_{hs}(256,33)$, $\beta_{ed2}(2,1)$, $\beta_{ed4}(4,1)$ | $(\beta_c^2+\beta_{hs}^2+\beta_{ec}^2)+R^2 \cdot (2 \cdot \beta_{ed12}^2+2 \cdot \beta_{ed34}^2)$ $(8.55 \cdot \beta_c^2 \cdot \beta_{hs}^2)+R^2 \cdot (7.11 \cdot [\beta_c^2 \cdot \beta_{ed34}^2+\beta_{hs}^2 \cdot \beta_{ed34}^2+\beta_{ec}^2 \cdot \beta_{ed34}^2]$ $+(8.67 \cdot [\beta_c^2 \cdot \beta_{ed12}^2+\beta_{hs}^2 \cdot \beta_{ed12}^2+\beta_{ec}^2 \cdot \beta_{ed12}^2])+$ $R^2 \cdot R^2 \cdot (17.35 \cdot \beta_{ed12}^2 \cdot \beta_{ed34}^2)$ $R^2 \cdot [28.3 \cdot \beta_c^2 \cdot \beta_{hs}^2 \cdot \beta_{ed12}^2+22.4 \cdot (\beta_c^2 \cdot \beta_{hs}^2 \cdot \beta_{ed34}^2)]+$ $R^2 \cdot R^2 \cdot (25.0 \cdot [(\beta_c^2 \cdot \beta_{ed12}^2 \cdot \beta_{ed34}^2+\beta_{hs}^2 \cdot \beta_{ed12}^2 \cdot \beta_{ed34}^2+\beta_{ec}^2 \cdot \beta_{ed12}^2 \cdot \beta_{ed34}^2)]$ | 1.56 |
| 5(4) | 1 | 0 | Yes/No | $\beta_d(SFd,SFd/4)$ | $\beta_c(256,0)$, $\beta_{hs}(256,64)$ | $(\beta_c^2+\beta_d^2+\beta_{hs}^2)$ $(5.74 \cdot \beta_c^2 \cdot \beta_{hs}^2)$ $0$ | 1.85 |

FIG. 4B

| Case | $N_{maxapch}$ | $L_e$ | HS Config | $\beta_x(SF,k)$ defines code $c_x=c_{ch,SF,k}$ for $\beta_x$ $\beta_{hs}=0$ if HS is not configured | Q | 1)$\left[\sum_m a_m \cdot \beta_m^2\right]$ 2)$\left[\sum_{i\neq j} b_{ij}\cdot\beta_i^2\cdot\beta_j^2\right]$ 3)$\left[\sum_{k\neq l\neq n} c_{kln}\cdot\beta_k^2\cdot\beta_l^2\cdot\beta_n^2\right]$ | k |
|---|---|---|---|---|---|---|---|
| 6(4) | 1 | 1 | Yes | $\beta_d(SFd,SFd/4)$, $\beta_{ec}(256,1)$, $\beta_{ed1}(SFed,SFed/2)$ | $\beta_c(256,0)$, $\beta_{hs}(256,64)$ | $(\beta_c^2+\beta_d^2+\beta_{hs}^2+\beta_{ec}^2)+R^2(\beta_{ed12}^2)$ | 1.56 |
| | | | | | | $(5.74\cdot\beta_c^2\cdot\beta_{hs}^2+\left[5.74+\dfrac{5.46}{SF_d}\right]\cdot\beta_d^2\cdot\beta_{ec}^2)+R^2\cdot\left(\left[8.31-\dfrac{2.64}{\min(SF_d,SF_{ed})}\right]\right.$ $\left.\cdot\beta_c^2\cdot\beta_{ed12}^2+\left[5.36+\dfrac{3.24}{SF_{ed}}\right]\cdot\beta_{ec}^2\cdot\beta_{ed12}^2+1.75\cdot\left[\beta_c^2\cdot\beta_{ed12}^2+\beta_{hs}^2\cdot\beta_{ed12}^2\right]\right)$ | |
| | | | | | | $R^2\cdot\left[3.4\cdot\beta_c^2\cdot\beta_{hs}^2\cdot\beta_{ed12}^2+(19.33+\dfrac{7.7}{SF_d}+\dfrac{5.9}{SF_{ed}}-\dfrac{5.9}{\min(SF_d,SF_{ed})}\right)$ $\cdot\beta_d^2\cdot\beta_{ec}^2\cdot\beta_{ed12}^2\right]$ | |
| 7(6) | 1 | 1 | No | $\beta_d(SFd,SFd/4)$, $\beta_{ec}(256,1)$ | $\beta_c(256,0)$, $\beta_{ed1}(SFed,SFed/2)$ | $(\beta_c^2+\beta_d^2+\beta_{ec}^2)+R^2(\beta_{ed12}^2)$ | 1.56 |
| | | | | | | $\left(\left[5.73+\dfrac{5.46}{SF_d}\right]\cdot\beta_d^2\cdot\beta_{ec}^2\right)+R^2\cdot(1.75\left[\beta_d^2\cdot\beta_{ed12}^2+\beta_{ec}^2\cdot\beta_{ed12}^2\right]$ $+\left[5.36+\dfrac{3.24}{SF_{ed}}\right]\cdot\beta_c^2\cdot\beta_{ed12}^2)$ | |
| | | | | | | $R^2\cdot\left[3.36+\dfrac{3.41}{SF_d}\right]\cdot\beta_d^2\cdot\beta_{ec}^2\cdot\beta_{ed12}^2$ | |

FIG. 4C

| Case | $N_{maxdpch}$ | $L_e$ | HS Config | I $\beta_x(SF,k)$ defines code $c_x=c_{ch,SF,k}$ for $\beta_x$ $\beta_{hs}=0$ if HS is not configured | Q | 1) $\left[\sum_m a_m \cdot \beta_m^2\right]$ 2) $\left[\sum_{i \neq j} b_{ij} \cdot \beta_i^2 \cdot \beta_j^2\right]$ 3) $\left[\sum_{k \neq l \neq n} c_{kln} \cdot \beta_k^2 \cdot \beta_l^2 \cdot \beta_n^2\right]$ | k |
|---|---|---|---|---|---|---|---|
| 8(3) | 1 | 2 | Yes | $\beta_d(SF_d,SF_d/4)$, $\beta_{ec}(256,1)$, $\beta_{ed1}(4,2)$, $\beta_{ed2}(4,2)$ | $\beta_c(256,0)$, $\beta_{hs}(256,64)$, $\beta_{ed2}(4,2)$ | $(\beta_c^2+\beta_d^2+\beta_{hs}^2+\beta_{ec}^2)+R^2\cdot(2\cdot\beta_{ed12})$ $5.75\cdot\beta_c^2\cdot\beta_{hs}^2+\left[5.73+\dfrac{5.46}{SF_d}\right]\cdot\beta_d^2\cdot\beta_{ec}^2+R^2\cdot(9.41\cdot\left[\beta_d^2\cdot\beta_{ed12}+\beta_{hs}^2\cdot\beta_{ed12}\right])$ $+7.92\cdot\left[\beta_c^2\cdot\beta_{ed12}+\beta_{ec}^2\cdot\beta_{ed12}\right]$ $R^2(22.8\cdot\beta_c^2\cdot\beta_{hs}^2\cdot\beta_{ed12}+\left[22.58+\dfrac{11.09}{SF_d}\right]\cdot\beta_d^2\cdot\beta_{ec}^2\cdot\beta_{ed12})$ | 1.56 |
| | | | No | $\beta_d(SF_d,SF_d/4)$, $\beta_{ec}(256,1)$, $\beta_{ed1}(4,2)$, $\beta_{ed2}(4,2)$ | $\beta_c(256,0)$, $\beta_{ed1}(4,2)$ | $(\beta_c^2+\beta_d^2+\beta_{hs}^2+\beta_{ec}^2)+R^2\cdot(2\cdot\beta_{ed12})$ $(5.75\cdot\beta_c^2\cdot\beta_{hs}^2+\left[5.73+\dfrac{5.46}{SF_d}\right]\cdot\beta_d^2\cdot\beta_{ec}^2)+R^2\cdot(8.67\cdot\left[\beta_c^2\cdot\beta_{ed12}+\beta_{ec}^2\cdot\beta_{ed12}\right])$ $\beta_d^2\cdot\beta_{ed12}+\beta_{hs}^2\cdot\beta_{ed12}+\beta_{ec}^2\cdot\beta_{ed12}$ | |
| 9(2) | 1 | 4 | Yes | $\beta_d(SF_d,SF_d/4)$, $\beta_{ec}(256,1)$, $\beta_{ed1}(2,1)$ | $\beta_c(256,0)$, $\beta_{hs}(256,64)$, $\beta_{ed2}(2,1)$ | | 1.56 |
| | | | No | $\beta_d(SF_d,SF_d/4)$, $\beta_{ec}(256,1)$, $\beta_{ed1}(2,1)$ | $\beta_c(256,0)$, $\beta_{ed1}(2,1)$ | $R^2(22.7\cdot\beta_c^2\cdot\beta_{hs}^2\cdot\beta_{ed12}+\left[22.58+\dfrac{11.09}{SF_d}\right]\cdot\beta_d^2\cdot\beta_{ec}^2\cdot\beta_{ed12})$ | |

FIG. 4D

ANALYTICAL COMPUTATION OF CUBIC METRIC

CROSS-REFERENCE TO RELATED APPLICATIONS

This application claims the benefit of U.S. Provisional Patent Application 61/294,016, filed Jan. 11, 2010, and U.S. Provisional Patent Application 61/371,464, filed Aug. 6, 2010, whose disclosures are incorporated herein by reference.

FIELD OF THE DISCLOSURE

The present disclosure relates generally to communication systems, and particularly to Cubic Metric (CM) computation in communication transmitters.

BACKGROUND

Cubic Metric (CM) is a characteristic of a signal produced by a transmitter. Transmitters use CM, for example, for setting the transmitter output power to match a given signal. The Third Generation Partnership Project (3GPP) defines CM for Wideband Code Division Multiple Access (WCDMA) systems in a Technical Specification entitled "Technical Specification Group Radio Access Network; User Equipment (UE) Radio Transmission and Reception (FDD) (Release 9)," TS 25.101, version 9.2.0, December, 2009, section 6.2.2, which is incorporated herein by reference. In particular, the specification defines the Maximum Power Reduction (MPR) of a User Equipment (UE) transmitter as a function of the signal CM.

The use of tables for setting the MPR in WCDMA transmitters is described, for example, in "Transmitter Maximum Power Reduction with HS-DPCCH and E-DCH Channels," Document R4-051174, 3GPP TSG-RAN Working Group 4 Meeting, Seoul, South Korea, Nov. 7-11, 2005, which is incorporated herein by reference. Setting of MPR based on CM is also addressed in "UE E-TFC and MPR," Document R4-050333, 3GPP TSG-RAN meeting, Athens, Greece, May 9-13, 2005, which is incorporated herein by reference. Certain aspects of CM for High-Order Modulation (HOM) are addressed in "Higher Order Modulations in HSPA Uplink—Practical Considerations," Document R1-063040, 3GPP TSG-RAN meeting, Riga, Latvia, Nov. 6-10, 2006, which is incorporated herein by reference.

The description above is presented as a general overview of related art in this field and should not be construed as an admission that any of the information it contains constitutes prior art against the present patent application.

SUMMARY

An embodiment that is described herein provides a method that includes determining attributes of multiple Code-Division Multiple Access (CDMA) signals, which are to be superimposed to form a composite CDMA signal for transmission by a wireless transmitter. A predefined analytical formula, which computes a Cubic Metric of the composite CDMA signal as a function of the attributes, is evaluated. Transmission of the composite CDMA signal by the wireless transmitter is controlled based on the computed Cubic Metric.

In some embodiments, controlling the transmission includes setting a transmit power of the wireless transmitter based on the computed Cubic Metric. In an embodiment, each of the multiple CDMA signals is of a respective channel type, and determining the attributes includes determining at least one attribute type selected from a group of types including a number of the CDMA signals belonging to a given channel type, a relative gain of a certain channel type, a cross-correlation factor between two or more of the channel types, and a spreading factor of a particular channel type.

In a disclosed embodiment, determining the attributes includes determining whether High Speed (HS) operation is configured in the wireless transmitter. In another embodiment, evaluating the formula includes selecting the formula from a set of predefined analytical formulas based on a range in which the attributes fall, and evaluating the selected formula.

There is additionally provided, in accordance with an embodiment that is described herein, apparatus including a wireless transmitter and a control unit. The wireless transmitter is configured to transmit a composite Code-Division Multiple Access (CDMA) signal including multiple CDMA signals. The control unit is configured to determine attributes of the multiple CDMA signals, to evaluate a predefined analytical formula that computes a Cubic Metric of the composite CDMA signal as a function of the attributes, and to control transmission of the composite CDMA signal by the wireless transmitter based on the computed Cubic Metric. In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

BRIEF DESCRIPTION OF THE DRAWINGS

FIGS. 3A-3C are tables showing examples of CDMA signal attributes, in accordance with an embodiment that is described herein; and FIGS. 4A-4D are tables showing partitioning of an analytical formula for CM computation into sub-formulas, in accordance with an embodiment that is described herein.

DETAILED DESCRIPTION OF EMBODIMENTS

Figure 1:
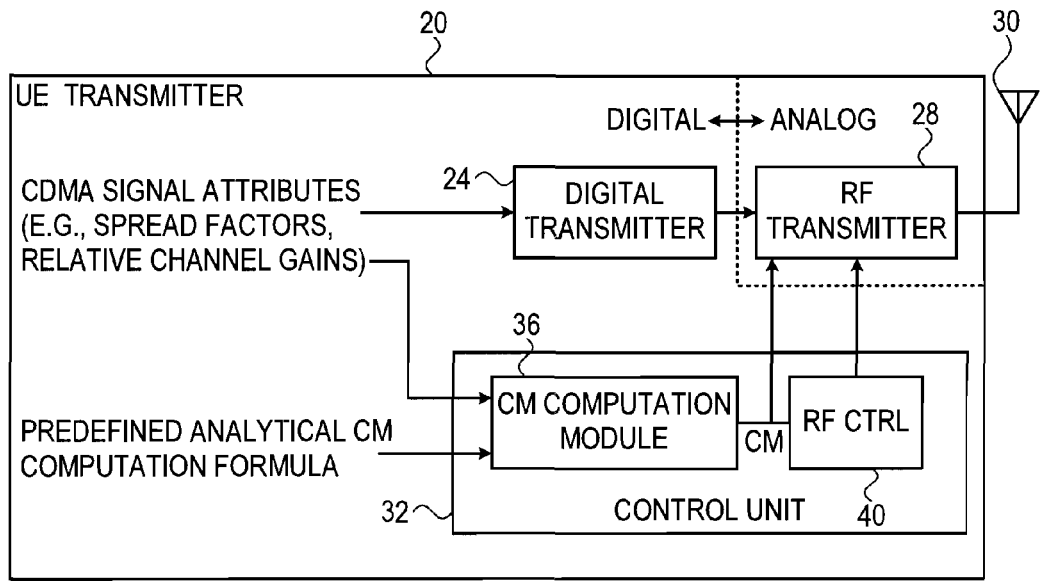
FIG. 1 is a block diagram that schematically illustrates a transmitter that uses a-priori Cubic Metric (CM) computation, in accordance with an embodiment that is described herein.

Cubic Metric (CM) is a numerical measure that characterizes signals produced by transmitters. The 3GPP TS 25.101 specification, for example, defines the CM for WCDMA signals as:

$$CM = \text{Ceil}[10 \text{gol}_{10}(CM_{Lin})/k, 0.5] \qquad \text{Equation 1}$$

wherein the Ceil[ ] operator rounds up to the nearest integer, and $CM_{Lin}$ is given by:

$$CM_{Lin} = \frac{\langle (v(t) \cdot v^*(t))^3 \rangle}{(\langle v(t) \cdot v^*(t) \rangle)^3} \cdot \frac{1}{\alpha_{REF}} \qquad \text{Equation 2}$$

wherein $\alpha_{REF}$ is defined as:

$$\alpha_{REF} = \frac{\langle (v(t)_{REF} \cdot v(t)^*_{REF})^3 \rangle}{(\langle v(t)_{REF} \cdot v(t)^*_{REF} \rangle)^3} \cong 1.42. \quad \text{Equation 3}$$

In the above equations, v(t) denotes the normalized voltage waveform of the WCDMA signal in question, and $v_{REF}(t)$ denotes the normalized voltage waveform of a reference signal. Constant k is set to 1.85 or 1.56, depending on the signal composition, as defined in the 3GPP TS 25.101 specification.

CM is useful, for example, for estimating the reduction in transmitter output power that is needed for achieving a specified signal quality for a given signal. In 3GPP WCDMA systems, for example, the CM can be used for determining the output power reduction that is expected to achieve the specified Adjacent Channel Leakage power Ratio (ACLR). High CM is indicative that the signal has high power peaks, and the transmitter power should therefore be backed-off further in order to avoid non-linear distortion effects. CM is often considered an accurate indication of the required power reduction, in comparison with other measures such as Peak-to-Average Power Ratio (PAPR).

Embodiments that are described herein provide improved methods and systems for computing CM using predefined analytical formulas based on signal attributes, and for controlling transmission of signals based on analytically-computed CM. These methods and systems calculate CM for a given Code-Division Multiple Access (CDMA) signal using a predefined analytical formula that computes CM as a function of various signal attributes. In contrast to the definition of CM in Equations 1-3 above, which is an a-posteriori definition that gives CM as a function of the output signal waveform, the analytical formula described herein is an a-priori formula that gives CM as a function of signal attributes.

In some embodiments, a wireless transmitter superimposes multiple Code-Division Multiple Access (CDMA) signals to form a composite COMA signal, and transmits a Radio Frequency (RF) signal carrying the composite CDMA signal to one or more receivers. A control unit controls the transmission of the composite CDMA signal by the transmitter. In an embodiment, the control unit holds a predefined analytical formula, which computes the CM of the composite CDMA signal as a function of attributes of the CDMA signals (e.g., spreading factors and relative gains of the signals). The control unit computes the CM of the composite signal using the analytical formula, and controls the power at which the transmitter transmits the composite CDMA signal based on the computed CM.

An example of an analytical formula for computing CM, and examples of signal attributes used in the formula, are described below. In some embodiments, the analytical formula is transformed to a set of simpler formulas, each applicable in a particular range of signal attributes. The disclosed analytical formulas compute the CM of a 3GPP WCDMA signal with high accuracy and modest computational complexity.

Although the embodiments described herein refer mainly to 3GPP WCDMA signals, the disclosed techniques can be used, mutatis mutandis, for computing CM for various other types of signals, such as, for example, Long-Term Evolution (LTE), LTE-Advanced (LTE-A), WiFi and WiMAX signals. Typically, each such signal type would use a different analytical formula for computing CM based on signal attributes, which is derived using the disclosed techniques. Although the embodiments described herein refer mainly to uplink signals, the disclosed techniques can be used for CM computation over downlink signals, as well.

FIG. 1 is a block diagram that schematically illustrates a UE transmitter 20 that uses a-priori CM computation based on signal attributes, in accordance with an embodiment that is described herein. In the present example, transmitter 20 is comprised in a WCDMA mobile communication terminal (UE) and operates in accordance with the 3GPP TS 25.101 specification, cited above. Alternatively, however, transmitter 20 may operate in accordance with any other suitable communication standard or protocol.

Transmitter 20 comprises a digital transmitter 24, a Radio Frequency (RF) transmitter 28 and a control unit 32. Digital transmitter 24 produces a composite CDMA signal, which comprises multiple CDMA signals (also referred to as physical channels). Each individual CDMA signal carries a certain physical channel, e.g., traffic channel or control channel, which is modulated using a certain spreading code. The multiple individual CDMA channels are superimposed onto one another to form the composite CDMA signal.

In various embodiments, digital transmitter 24 may produce a composite signal comprising various types of individual CDMA signals (physical channels), such as, for example, a Dedicated Physical Control Channel (DPCCH), a Dedicated Physical Data Channel (DPDCH), a High Speed Dedicated Physical Control Channel (HS-DPCCH), an Enhanced Dedicated Physical Control Channel (E-DPCCH) and an Enhanced Dedicated Physical Data channel (E-DPDCH). The numbers and types of CDMA signals in the composite CDMA signal may vary over time in a given transmitter, and/or from one transmitter to another.

A Radio Frequency (RF) transmitter 28 accepts the composite CDMA signal from digital transmitter 24. The RF transmitter produces an RF signal that carries the composite CDMA signal. Typically, the RF transmitter up-converts the composite CDMA signal from baseband to RF, filters the signal and amplifies the signal to the appropriate transmission power. The RF signal is then transmitted via an antenna 30.

In some embodiments, control unit 32 in transmitter 20 controls the output power of RF transmitter 28 based on a computed estimate of the CM of the composite CDMA signal carried by the RF signal. In an embodiment, control unit 32 comprises a CM computation module 36, which computes the CM of the composite CDMA signal using a predefined analytical formula. An RF control module 40 then sets the output power of RF transmitter 28 based on the computed CM. In a typical implementation, RF control module 40 increases or decreases the gain of RF transmitter 28 as a function of the computed CM, so as to set the appropriate output power.

In some embodiments, the computed CM is also provided directly to RF transmitter 28. In an example embodiment, the transmitter calibrates the gain of one or more of its components based on the computed CM. Although the embodiments described herein refer mainly to setting of the transmitter output power based on CM, the CM values that are computed using the disclosed techniques can be used for any other suitable purpose. For example, in some embodiments CM is used as an indication of the level of leakage of the transmitted signal into adjacent frequencies, and/or as an indication of maximum transmission data rate.

The transmitter configuration shown in FIG. 1 is an example configuration, which is depicted solely for the sake of clarity. In alternative embodiments, any other suitable transmitter configuration can also be used. Digital transmitter 24 and RF transmitter 28 are referred to collectively as a wireless transmitter that generates and transmits an RF signal carrying the composite CDMA signal. Some transmitter elements that are not mandatory for understanding of the disclosed techniques have been omitted from the figure for the sake of clarity.

The different transmitter elements are typically implemented using dedicated hardware, such as using one or more Application-Specific Integrated Circuits (ASICs), Field-Programmable Gate Arrays (FPGAs) and/or RF Integrated Circuits (RFICs). Alternatively, some transmitter elements (e.g., some or all of control unit 32) may be implemented using software executing on programmable hardware, or using a combination of hardware and software elements. In some embodiments, some or all of the elements of transmitter 20 are fabricated in a chip-set.

When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

In some embodiments, the composite CDMA signal and the individual CDMA signals are characterized by various attributes. (In the description that follows, the terms "CDMA signal," "individual CDMA signal" and "physical channel" are used interchangeably.) The attributes may comprise, for example, relative gains between different types of physical channels. The relative gains are denoted $\beta_m$, wherein m denotes the type of physical channel. Different values of m correspond to different physical channel types, as listed in the following table. The gain factors are specified relative to the DPCCH physical channel.

TABLE 1

Relative gain factors

| Physical channel type | Relative gain |
|---|---|
| DPCCH | $\beta c$ |
| HS-DPCCH | $\beta hs$ |
| E-DPCCH | $\beta ec$ |
| E-DPDCH | $\beta ed$ |

Another attribute is the number of physical channels of a given type that are included in the composite CDMA signal. The number of physical channels of type m is denoted $a_m$. An additional attribute is a dual cross factor denoted $b_{ij}$, which indicates the cross-correlation between the physical channels of type i and the physical channels of type j. Yet another attribute is a triple cross factor denoted $c_{kln}$, which indicates the triple cross-correlation among the physical channels of types k, l and n.

Another type of attribute is the Spread Factor (SF) of the spreading code that is used for spreading a given physical channel. The SF of the DPDCH physical channel, for example, is denoted $SF_d$, and The SF of the E-DPDCH physical channel, for example, is denoted $SF_{ed}$. An additional type of attribute is the maximum permitted number of DPDCH physical channels, denoted $N_{MAXDPDCH}$. Another type of attribute is a flag or other Boolean indication, which indicates whether High Speed (HS) operation is enabled (configured) or not in the transmitter.

In some embodiments, CM computation module 36 computes the CM using the following analytical formula:

$$CM_{Lin} = 1 + \frac{\left[\sum_m a_m \cdot \beta_m^2\right] \cdot \left[\sum_{i \neq j} b_{ij} \beta_i^2 \cdot \beta_j^2\right] \cdot \left[\sum_{k \neq l \neq n} c_{kln} \beta_k^2 \cdot \beta_l^2 \cdot \beta_n^2\right]}{\left[\sum_m a_m \cdot \beta_m^2\right]^3} \quad \text{Equation 4}$$

CM is derived from $CM_{Lin}$ using Equation 1 above. The mathematical derivation of the analytical formula of Equation 4 from Equations 1-3 above is detailed in U.S. Provisional Patent Application 61/294,016, cited above. As can be seen in Equation 4, $CM_{Lin}$ (and thus CM) depends on the signal attributes $a_m$, $b_{ij}$ and $c_{kln}$, defined above. The signal attributes in turn depend on the structure of the composite signal, e.g., the physical channels making up the composite CDMA signal and the spread factors used for spreading the physical channels.

The analytical formula given in Equation 4, and the types of signal attributes defined above, are given purely by way of example. In alternative embodiments, module 36 may compute the CM as a function of any other suitable signal attributes, and using any other suitable analytical formula.

Figure 2:
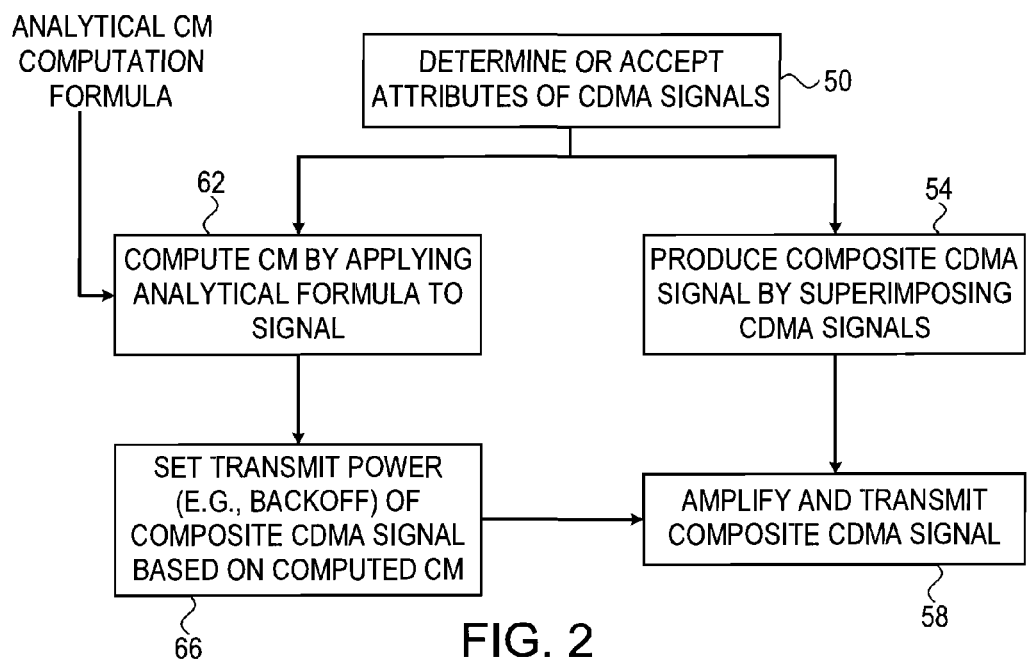
FIG. 2 is a flow chart that schematically illustrates a method for a-priori CM computation, in accordance with an embodiment that is described herein.

FIG. 2 is a flow chart that schematically illustrates a method for a-priori CM computation using an analytical formula, in accordance with an embodiment that is described herein. The method begins at an attribute input operation 50, with CM computation module 36 accepting or determining the attributes of the CDMA signals that are to be generated by digital transmitter 24 (e.g., relative gains, cross factors and spread factors). The signal attributes can be provided, for example, by another module in control unit 32 or by any other suitable UE or transmitter element.

Using the signal attributes, digital transmitter 24 generates a composite CDMA signal comprising multiple superimposed CDMA signals (physical channels), at a signal generation operation 54. RF transmitter 28 up-converts the composite CDMA signal to RF, and amplifies and transmits the RF signal, at a transmission operation 58.

At a CM computation operation 62, CM computation module 36 computes the CM of the composite CDMA signal by applying an analytical formula (e.g., Equation 4) to the signal attributes that were accepted at operation 50 above. Based on the computed CM, RF control module 40 controls the power at which RF transmitter 28 transmits the RF signal, at a power setting operation 66.

Typically, larger CM values indicate that a larger back-off (lower transmit power) is needed, and vice versa. Thus, module 40 typically sets transmitter 28 to have a lower gain for higher CM values, and vice versa. As a result, the RF transmitter transmits the RF signal (at operation 58) while meeting the specified signal quality (e.g., while meeting an ACLR specification).

FIGS. 3A-3C are tables showing examples of CDMA signal attributes, in accordance with an embodiment that is described herein. The figures refer to six examples of composite CDMA signals, and the corresponding signal attributes. In some embodiments, module 36 substitutes the signal attributes shown in the figures into the analytical formula of equation 4 above, in order to compute the CM of the composite CDMA signal.

FIG. 3A lists the signal attributes for the six example cases. In the present example, the composite CDMA signal is complex, i.e., comprises orthogonal In-phase (I) and Quadrature (Q) components. Each physical channel (individual CDMA signal is superimposed on either the I or the Q component of the composite signal. The signal attributes in this example comprise the relative gains (β values) between the physical channels, the $N_{MAXDPCH}$ parameter, and a flag indicating whether HS is configured. FIG. 3B lists the β values and the $a_m$ values (the number of physical channels of each type) for the six example cases. The $a_m$ values are represented as a six-element vector in which the $m^{th}$ element gives the $a_m$ value of $β_m$. FIG. 3C gives the cross factors $b_{ij}$ and $c_{kln}$ that should be used in Equation 4 for each of the six example cases. As can be seen in the figure, in some cases these values depend on the spread factors used.

In some embodiments, CM computation module 36 computes CM for the composite signal of a given example case by substituting the $a_m$ values from FIG. 3B and the cross factors $b_{ij}$ and $c_{kln}$ from FIG. 3C into the analytical formula of Equation 4, and then evaluate the analytical formula.

In some embodiments, CM computation module 36 uses a partitioning of the analytical formula (Equation 4) into multiple, simpler sub-formulas. Each sub-formula approximates the original analytical formula in a specific range of the signal attributes. In these embodiments, module 36 computes CM for a certain composite CDMA signal by identifying the range in which the signal attributes fall, and then evaluating the sub-formula for that range. This technique considerably simplifies the computations carried out by module 36.

FIGS. 4A-4D are tables showing partitioning of an analytical formula for CM computation into sub-formulas, in accordance with an embodiment that is described herein. The present example refers to the following channelization scheme:

TABLE 2

Example channelization scheme

| Physical channel | I/Q | Gain factor | Channelization code |
|---|---|---|---|
| DPCCH | Q | $β_c$ | $C_{Ch,256,0}$ |
| DPDCH | I | $β_{d,1}$ | $C_{Ch,SF,SF/4}$ |
| E-DPCCH | I | $β_{ec}$ | $C_{Ch,256,1}$ |
| $N_{MAXDPCH} = 0$, HS is/is not configured | | | |
| HS-DPCCH | Q | $β_{hs}$ | $C_{Ch,256,33}$ |
| E-DPDCH$_1$ | I | $β_{ed1}$ | $C_{Ch,SF,SF/4}$ (SF ≥ 4) |
| | | | $C_{Ch,2,1}$ (SF = 2) |
| E-DPDCH$_2$ | Q | $β_{ed2}$ | $C_{Ch,4,1}$ (SF = 4) |
| | | | $C_{Ch,2,1}$ (SF = 2) |
| E-DPDCH$_3$ | I | $β_{ed3}$ | $C_{Ch,4,1}$ |
| E-DPDCH$_4$ | Q | $β_{ed4}$ | $C_{Ch,4,1}$ |
| $N_{MAXDPCH} = 1$, HS not configured | | | |
| E-DPDCH$_1$ | Q | $β_{ed1}$ | $C_{Ch,SF,SF/2}$ (SF ≥ 4) |
| E-DPDCH$_2$ | I | $β_{ed2}$ | $C_{Ch,4,2}$ (SF = 4) |
| | | | $C_{Ch,2,1}$ (SF = 2) |
| $N_{MAXDPCH} = 1$, HS is configured | | | |
| HS-DPCCH | Q | $β_{hs}$ | $C_{Ch,256,64}$ |
| E-DPDCH$_1$ | I | $β_{ed1}$ | $C_{Ch,SF,SF/2}$ (SF ≥ 4) |
| E-DPDCH$_2$ | Q | $β_{ed2}$ | $C_{Ch,4,2}$ (SF = 4) |
| | | | $C_{Ch,2,1}$ (SF = 2) |

In table 2, HS denotes a High-Speed Downlink Packet Access (HSDPA) transmission protocol, which is optionally configured in the transmitter. FIGS. 4A-4D show nine sub-formulas that are applicable for nine respective different ranges of signal attributes. These attribute ranges cover the six example cases shown in FIGS. 3A-3C. In the present example, the signal attributes are $N_{MAXDPCH}$, $L_e$ (the number of E-DPDCH channels) and indication whether HSDPA is configured, and $a_m$, $b_{ij}$ and $c_{kln}$ depend on these attributes.

For each of the nine ranges, the tables of FIGS. 4A-4D give approximated and simplified forms (sub-formulas) for the three terms $[\sum_m a_m \cdot β_m^2]$, $[\sum_{i \neq j} b_{ij} β_i^2 \cdot β_j^2]$ and $[\sum_{k \neq l \neq n} c_{kln} β_k^2 \cdot β_l^2 \cdot β_n^2]$ in the numerator of Equation 4. In some embodiments, CM computation module 36 identifies the range in which the signal attributes fall, and then evaluates the numerator of Equation 4 using the sub-formula that corresponds to that range.

As noted above, in various embodiments the transmitter elements are implemented using various combinations of hardware and/or software components. In $β_c^2$, $β_d^2$, $β_{ec}^2$, $β_{hs,ACK}^2$, $β_{hs,NACK}^2$, $β_{hs,CQI}^2$, and $1/SF_d$ that appear in FIGS. 4A-4D is performed by module 36 using firmware, e.g., in an FPGA. In an embodiment, calculation of the terms $1/SF_{ed}$, $β_{ed12}^2$ and $β_{ed34}^2$ and selection of the applicable range are performed by module 36 at the Transmission Time Interval (TTI) boundary, as the CM is typically calculated before $β_{ed}$ reduction. In an embodiment, $β_{hs}^2$ calculated by module 36 using software. Note that, in FIGS. 4A-4D, if HS is not configured, then $β_{hs}^2 = 0$.

Although the embodiments described herein mainly address CM calculation is wireless transmitters, the methods and systems described herein can also be used in other applications, such as in calculating CM for calibrating transmitter power detectors.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
predefining an analytical formula that expresses a Cubic Metric of a composite Code-Division Multiple Access (CDMA) signal, which is made-up of multiple superimposed digital CDMA signals, as a function of attributes of the multiple digital CDMA signals;
identifying the attributes of the multiple digital CDMA signals, which are to be superimposed to form the composite CDMA signal for transmission by a wireless transmitter;
using a control unit coupled to the wireless transmitter, evaluating the predefined analytical formula for the identified attributes, so as to compute the Cubic Metric of the composite CDMA signal; and
controlling transmission of the composite CDMA signal by the wireless transmitter based on the computed Cubic Metric.

2. The method according to claim 1, wherein controlling the transmission comprises setting a transmit power of the wireless transmitter based on the computed Cubic Metric.

3. The method according to claim 1, wherein each of the multiple digital CDMA signals is of a respective channel type, and wherein determining the attributes comprises determining at least one attribute type selected from a group of types comprising a number of the digital CDMA signals belonging to a given channel type, a relative gain of a certain channel type, a cross-correlation factor between two or more of the channel types, and a spreading factor of a particular channel type.

4. The method according to claim 1, wherein determining the attributes comprises determining whether High Speed (HS) operation is configured in the wireless transmitter.

5. The method according to claim 1, wherein evaluating the formula comprises selecting the formula from a set of predefined analytical formulas based on a range in which the attributes fall, and evaluating the selected formula.

6. Apparatus, comprising:
a wireless transmitter, which is configured to transmit a composite Code-Division Multiple Access (CDMA) signal comprising multiple digital CDMA signals; and
a control unit, which is configured to predefine an analytical formula that expresses a Cubic Metric of the composite Code-Division Multiple Access (CDMA) signal as a function of attributes of the multiple digital CDMA signals, to identify the attributes of the multiple digital CDMA signals, to evaluate the predefined analytical formula for the identified attributes, so as to compute the Cubic Metric of the composite CDMA signal, and to control transmission of the composite CDMA signal by the wireless transmitter based on the computed Cubic Metric.

7. The apparatus according to claim 6, wherein the control unit is configured to set a transmit power of the wireless transmitter based on the computed Cubic Metric.

8. The apparatus according to claim 6, wherein each of the multiple digital CDMA signals is of a respective channel type, and wherein the control unit is configured to determine at least one attribute type selected from a group of types comprising a number of the digital CDMA signals belonging to a given channel type, a relative gain of a certain channel type, a cross-correlation factor between two or more of the channel types, and a spreading factor of a particular channel type.

9. The apparatus according to claim 6, wherein the control unit is configured to determine the attributes by determining whether High Speed (HS) operation is configured in the wireless transmitter.

10. The apparatus according to claim 6, wherein the control unit is configured to select the formula from a set of predefined analytical formulas based on a range in which the attributes fall, and to evaluate the selected formula.

11. A mobile communication terminal comprising the apparatus of claim 6.

12. A chipset for processing signals in a mobile communication terminal, comprising the apparatus of claim 6.

* * * * *